United States Patent
Mohammadi et al.

(10) Patent No.: US 11,827,815 B2
(45) Date of Patent: Nov. 28, 2023

(54) POLYETHYLENE COPOLYMER AND TERPOLYMER HOTMELT ADHESIVE COMPOSITIONS, ARTICLES AND METHODS OF PREPARING SAME

(71) Applicant: Braskem S.A., Camaçari (BR)

(72) Inventors: Hadi Mohammadi, Philadelphia, PA (US); Nei Sebastião Domingues Junior, São Paulo (BR)

(73) Assignee: Braskem S.A., Camaçari (BR)

( * ) Notice: Subject to any disclaimer, the term of this patent is extended or adjusted under 35 U.S.C. 154(b) by 3 days.

(21) Appl. No.: 17/579,301

(22) Filed: Jan. 19, 2022

(65) Prior Publication Data
US 2022/0228041 A1    Jul. 21, 2022

Related U.S. Application Data

(60) Provisional application No. 63/139,016, filed on Jan. 19, 2021.

(51) Int. Cl.
  *C09J 123/08*    (2006.01)
  *C09J 5/06*      (2006.01)
  *C09J 11/08*     (2006.01)
  *C09J 131/04*    (2006.01)

(52) U.S. Cl.
  CPC ............... *C09J 123/08* (2013.01); *C09J 5/06* (2013.01); *C09J 11/08* (2013.01); *C09J 131/04* (2013.01); *C09J 2423/04* (2013.01); *C09J 2431/00* (2013.01); *C09J 2491/00* (2013.01)

(58) Field of Classification Search
  CPC ... C09J 5/06; C09J 11/08; C09J 131/04; C09J 2423/04; C09J 2431/00; C09J 2491/00
  See application file for complete search history.

(56) References Cited

U.S. PATENT DOCUMENTS

| | | | |
|---|---|---|---|
| 4,129,714 | A | 12/1978 | Colburn et al. |
| 6,479,719 | B1 | 11/2002 | Kotwica et al. |
| 6,746,555 | B1 | 6/2004 | Kunstle et al. |
| 2004/0226216 | A1 | 11/2004 | Krull et al. |
| 2017/0183430 | A1 | 6/2017 | Devisme et al. |
| 2021/0102014 | A1 | 4/2021 | Hanlon et al. |

FOREIGN PATENT DOCUMENTS

| | | | | |
|---|---|---|---|---|
| CN | 1226280 A | * | 8/1999 | ........ C09J 123/0815 |
| EP | 1433836 A1 | | 6/2004 | |
| EP | 2514803 A1 | | 10/2012 | |
| JP | 04236286 A | * | 8/1992 | |
| JP | H04236286 A | | 8/1992 | |
| JP | 4783209 B2 | | 9/2011 | |
| WO | 2010105979 A1 | | 9/2010 | |

OTHER PUBLICATIONS

Machine Translation JP4-236286 (Year: 1992).*
International Search Report issued in corresponding International Application No. PCT/IB2022/020001; dated May 3, 2022(3 pages).
Written Opinion of the International Searching Authority issued in corresponding International Application No. PCT/ B2022/020001; dated May 3, 2022 (8 pages).
International Search Report issued in International Application No. PCT/IB2020/020059, dated Dec. 17, 2020 (5 pages).
Written Opinion issued in International Application No. PCT/IB2020/020059, dated Dec. 17, 2020 (7 pages).
International Search Report issued in International Application No. PCT/IB2020/020058, dated Feb. 24, 2021 (10 pages).
Written Opinion issued in International Application No. PCT/IB2020/020058, dated Feb. 24, 2021 (10 pages).

* cited by examiner

*Primary Examiner* — Daniel McNally
(74) *Attorney, Agent, or Firm* — Osha Bergman Watanabe & Burton LLP

(57) ABSTRACT

A hotmelt adhesive composition includes a polymer produced from ethylene, one or more branched vinyl ester monomers, and optionally, vinyl acetate, and a tackifier. A method for producing the hotmelt adhesive composition includes adding a polymer produced from ethylene, one or more branched vinyl ester monomers, and optionally, vinyl acetate and a tackifier into a mixer, optionally adding wax and/or antioxidant into the mixer, and mixing the polymer and the tackifier, and the optional wax and/or antioxidant at a temperature in a range from 150° C. to 200° C. to form the hot melt adhesive composition. A method for bonding a substrate to a similar or dissimilar substrate includes applying the hotmelt adhesive composition to at least one substrate; and bonding the substrate and the hotmelt adhesive composition together. A multi-layer article comprises at least one layer of the hotmelt adhesive compositions and one or more substrate layers.

24 Claims, No Drawings

POLYETHYLENE COPOLYMER AND TERPOLYMER HOTMELT ADHESIVE COMPOSITIONS, ARTICLES AND METHODS OF PREPARING SAME

BACKGROUND

The manufacture of polyolefin materials such as polyethylene (PE) and polypropylene (PP) are the highest production volume of a synthetic polymer ever invented. The success of these materials were greatly achieved due to its low production cost, energy efficiency, low greenhouse gas emission, versatility to produce a wide range of polymers with different properties, and high polymer processability. The wide range of articles produced with polyolefin materials includes films, molded products, foams, pipes, textiles, and the like. The increasing complexity of manufactured goods has led to major improvements and developments, particularly in the hotmelt adhesive industry. Hotmelt adhesives are being used to bond a wider variety of substrates, within a broader adhesive application process window, and for a large end-use portfolio. During application, hotmelt adhesives are applied in a molten state and cooled to harden the adhesive layer. In addition, the adhesive needs to fulfill multiple requirements once set, which may include suitable bond strength, bond retention under or after mechanical stress, and under or after various thermal conditions.

The physical and chemical properties of hotmelt adhesives may exhibit varied responses depending on a number of factors such as molecular weight, distribution of molecular weights, content, nature and distribution of comonomer (or comonomers), the presence of short and/or long chain-branches and its distribution, thermal and shear history, and the like, which define their applicability in certain applications. To increase their utilization, hotmelt adhesives may contain polymers, which may be formulated as random and block copolymers with a number of possible comonomers and may further contain a number of potential additives.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a hotmelt adhesive composition that includes a polymer produced from ethylene, one or more branched vinyl ester monomers, and optionally, vinyl acetate, and a tackifier.

In another aspect, embodiments disclosed herein relate to a method for producing the hotmelt adhesive composition that includes adding a polymer produced from ethylene, one or more branched vinyl ester monomers, and optionally, vinyl acetate and a tackifier into a mixer, optionally adding wax and/or antioxidant into the mixer, and mixing the polymer and the tackifier, and the optional wax and/or antioxidant at a temperature in a range from 150° C. to 200° C. to form the hot melt adhesive composition.

In yet another aspect, embodiments disclosed herein relate to a use of the hotmelt adhesive composition for bonding a substrate to a similar or dissimilar substrate, wherein the substrate is selected from a group consisting of fabric, non-woven materials, polyurethane, ethylene vinyl acetate copolymer, polypropylene, polyethylene, polyvinylchloride, polyester, polyamide, wood, metal, paper and kraft.

In another aspect, embodiments disclosed herein relate to a method for bonding a substrate to a similar or dissimilar substrate that includes applying the hotmelt adhesive composition to at least one substrate; and bonding the substrate and the hotmelt adhesive composition together.

In another aspect, embodiments disclosed herein relate to a multi-layer article, comprising at least one layer of the hotmelt adhesive compositions and one or more substrate layers.

Other aspects and advantages of the claimed subject matter will be apparent from the following description and the appended claims.

DETAILED DESCRIPTION

In one aspect, embodiments disclosed relate to a hotmelt adhesive composition that includes a polymer produced from ethylene, one or more branched vinyl ester monomers, and optionally, vinyl acetate and a tackifier. In one or more embodiments, the hotmelt adhesive compositions may optionally include a secondary polymer, waxes, antioxidants, plasticizers, UV stabilizers, pigments and dyes, glitter, biocides, flame-retardants, anti-static agents, and fillers.

In one or more embodiments, the polymer may be prepared from a reaction of ethylene and one or more branched vinyl esters and optionally vinyl acetate that modify various properties of the formed copolymer including molecular weight, molecular weight distribution, crystallinity, hardness, melt temperature, glass transition temperature, among others.

In one or more embodiments, the hotmelt adhesive compositions may include the polymer that has a number average molecular weight (Mn) ranging from 5 to 10,000 kDa, and a molecular weight distribution ranging from 1 to 60, obtained by GPC.

Hotmelt adhesive compositions in accordance with the present disclosure may include polymers which are copolymers incorporating various ratios of ethylene and one or more branched vinyl esters. In one or more embodiments, the polymer may be prepared by reacting ethylene and a branched vinyl ester in the presence of additional comonomers and one or more radical initiators to form a copolymer. In other embodiments, the hotmelt adhesive compositions may include polymers which are terpolymers. Terpolymers may be prepared by reacting ethylene with a first comonomer to form a polymer resin or prepolymer, which is then reacted with a second comonomer to prepare the final polymer composition, wherein the first and the second comonomer can be added in the same reactor or in different reactors. In one or more embodiments, the terpolymers may consist of ethylene, one or more branched vinyl ester and vinyl acetate. In one or more embodiments, copolymers may be prepared by reacting ethylene and one or more comonomers at one or more polymerization reaction stages to obtain various repeat unit microstructures.

Branched Vinyl Ester Monomers

In one or more embodiments, branched vinyl esters may include branched vinyl esters generated from isomeric mixtures of branched alkyl acids. Branched vinyl esters in accordance with the present disclosure may have the general structure (I):

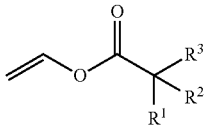

where $R^1$, $R^2$, and $R^3$ have a combined carbon number in the range of C3 to C20. In one or more embodiments, $R^1$, $R^2$, and $R^3$ may all be alkyl chains having varying degrees of branching in one or more embodiments, or a subset of $R^1$, $R^2$, and $R^3$ may be independently selected from a group consisting of hydrogen, alkyl, or aryl in one or more embodiments.

In one or more embodiments, the branched vinyl ester monomers may include branched vinyl esters having the general structure (II):

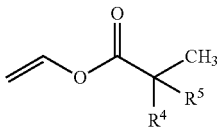

wherein $R^4$ and $R^5$ have a combined carbon number of 6 or 7 and the polymer composition has a number average molecular weight ($M_n$) ranging from 5 kDa to 10000 kDa obtained by GPC. In one or more embodiments, $R^4$ and $R^5$ may have a combined carbon number of less than 6 or greater than 7, and the polymer composition may have an $M_n$ up to 10000 kDa. That is, when the $M_n$ is less than 5 kDa, $R^4$ and $R^5$ may have a combined carbon number of less than 6 or greater than 7, but if the $M_n$ is greater than 5 kDa, such as in a range from 5 to 10000 kDa, $R^4$ and $R^5$ may include a combined carbon number of 6 or 7. In particular embodiments, $R^4$ and $R^5$ have a combined carbon number of 7, and the $M_n$ may range from 5 to 10000 kDa. Further in one or more particular embodiments, a vinyl ester according to Formula (II) may be used in combination with vinyl acetate.

Examples of branched vinyl esters may include monomers having the chemical structures, including derivatives thereof:

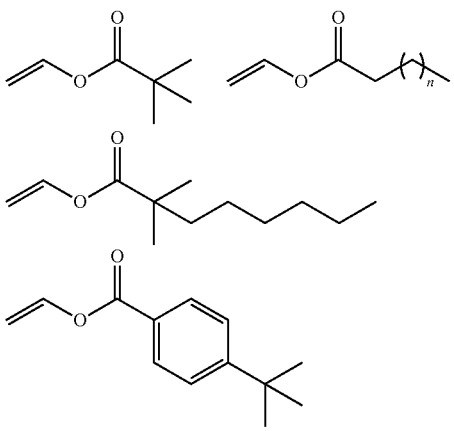

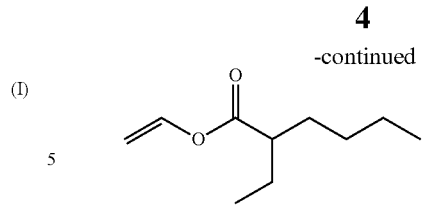

In one or more embodiments, the hotmelt adhesive compositions may include polymers that have a branched vinyl ester content that ranges from a lower limit selected from one of 0.01 wt %, 0.1 wt %, 1 wt %, 5 wt %, 10 wt %, 20 wt %, or 30 wt % to an upper limit selected from 50 wt %, 60 wt %, 70 wt %, 80 wt %, 89.99 wt %, or 90 wt % where any lower limit may be paired with any upper limit.

In one or more embodiments, branched vinyl esters may include monomers and comonomer mixtures containing vinyl esters of neononanoic acid, neodecanoic acid, and the like. In one or more embodiments, branched vinyl esters may include Versatic™ acid series tertiary carboxylic acids, including Versatic™ acid EH, Versatic™ acid 9 and Versatic™ acid 10 prepared by Koch synthesis, commercially available from Hexion™ chemicals. In one or more embodiments, the hotmelt adhesive compositions may include polymers generated from monomers derived from petroleum and/or renewable sources.

Hotmelt adhesive compositions in accordance with the present disclosure may include a branched vinyl ester-containing polymer with a percent by weight of ethylene measured by proton nuclear magnetic resonance ($^1$H NMR) and Carbon 13 nuclear magnetic resonance ($^{13}$C NMR) that ranges from a lower limit selected from one of 10 wt %, 20 wt %, or 30 wt %, to an upper limit selected from one of 60 wt %, 70 wt %, 80 wt %, 90 wt %, 95 wt %, 99.9 wt %, and 99.99 wt % where any lower limit may be paired with any upper limit.

Hotmelt adhesive compositions in accordance with the present disclosure may include a branched vinyl ester-containing polymer with a percent by weight of vinyl ester monomer, such as that of Formula (I) and (II) above, measured by $^1$H NMR and $^{13}$C NMR that ranges from a lower limit selected from one of 0.01 wt %, 0.1 wt %, 1 wt %, 5 wt %, 10 wt %, 20 wt %, or 30 wt % to an upper limit selected from 50 wt %, 60 wt %, 70 wt %, 80 wt %, 89.99 wt %, or 90 wt % where any lower limit may be paired with any upper limit.

In one or more embodiments, hotmelt adhesive compositions in accordance with the present disclosure may optionally include a branched vinyl ester-containing polymer with a percent by weight of vinyl acetate measured by $^1$H NMR and $^{13}$C NMR that ranges from a lower limit selected from one of 0 wt %, 0.01 wt %, 0.1 wt %, 1 wt %, 5 wt %, 10 wt %, 20 wt %, or 30 wt % to an upper limit selected from 50 wt %, 60 wt %, 70 wt %, 80 wt %, or 89.99 wt % where any lower limit may be paired with any upper limit.

Hotmelt adhesive compositions in accordance with the present disclosure may include a branched vinyl ester-containing polymer with a number average molecular weight (Mn) in kilodaltons (kDa) measured by gel permeation chromatography (GPC) that ranges from a lower limit selected from one of 1 kDa, 5 kDa, 10 kDa, 15 kDa, and 20 kDa to an upper limit selected from one of 40 kDa, 50 kDa, 100 kDa, 300 kDa, 500 kDa, 1000 kDa, 5000 kDa, and 10000 kDa, where any lower limit may be paired with any upper limit.

Hotmelt adhesive compositions in accordance with the present disclosure may include a branched vinyl ester-containing polymer with a molecular weight distribution (MWD, defined as the ratio of $M_w$ over $M_n$) measured by GPC that has a lower limit of any of 1, 2, 5, or 10, and an upper limit of any of 20, 30, 40, 50, or 60, where any lower limit may be paired with any upper limit.

Hotmelt adhesive compositions in accordance with the present disclosure may have a branched vinyl ester-containing polymer with a weight average molecular weight ($M_w$) in kilodaltons (kDa) measured by GPC that ranges from a lower limit selected from one of 1 kDa, 5 kDa, 10 kDa, 15 kDa and 20 kDa to an upper limit selected from one of 40 kDa, 50 kDa, 100 kDa, 200 kDa, 300 kDa, 500 kDa, 1000 kDa, 2000 kDa, 5000 kDa, 10000 kDa, and 20000 kDa, where any lower limit may be paired with any upper limit.

In one or more embodiments, hotmelt adhesive compositions may contain branched vinyl ester-containing polymers in an amount ranging from a lower limit selected from one of 10 wt %, 15 wt %, 20 wt % and 30 wt % to an upper limit selected from one of 40 wt %, 50 wt %, 60 wt % 70 wt %, 80 wt % and 90 wt % of the hotmelt adhesive composition, where any lower limit may be paired with any upper limit.

Secondary Polymers

In one or more embodiments, hot melt adhesive compositions in accordance with the present disclosure may further comprise a secondary polymer selected from the group consisting of ethylene-vinyl acetate copolymers (EVA), ethylene-acrylic ester copolymers such as ethylene-butyl acrylate copolymer (EBA), ethylene-methyl acrylate copolymer (EMA), polyethylene, polypropylene, styrene block copolymers (such as SBS, SIS, SEBS, SEPS), and combinations thereof.

Secondary polymers in accordance with the present disclosure may have a melt index as determined by ASTM D1238 as measured with a load of 2.16 kg at 190° C. that ranges from a lower limit selected from any one of 0.1 g/10 min, 1 g/10 min, 2 g/10 min, 2.5 g/10 min, 25 g/10 min, 100 g/10 min, 150 g/10 min, and 200 g/10 min, to an upper limit selected from 250 g/10 min, 300 g/10 min, 400 g/10 min, 500 g/10 min, and 1000 g/10 min, where any lower limit may be paired with any upper limit.

In one or more embodiments, hotmelt adhesive compositions may contain secondary polymers in an amount ranging from a lower limit selected from one of 0.1 wt %, 1 wt %, 2 wt %, 5 wt %, 7 wt %, 10 wt %, 15 wt %, and 20 wt % to an upper limit selected from one of 25 wt %, 30 wt %, 40 wt %, 45 wt %, 50 wt %, 60 wt %, 70 wt %, 80 wt %, and 90 wt % of the hotmelt adhesive composition, where any lower limit may be paired with any upper limit.

Tackifiers

Tackifiers in accordance with the present disclosure may be a chemical compound or low molecular weight polymer that enhances the adhesion of a hot melt adhesive composition. Tackifiers include any compatible resins or mixtures thereof such as natural and modified rosins including gum rosin, wood rosin, tall oil rosin, distilled rosin, hydrogenated rosin, dimerized rosin, rosin esters, and polymerized rosin; glycerol and pentaerythritol esters of natural and modified rosins, including phenolic-modified rosins and rosin esters; monomeric resins; polymers and copolymers of natural terpenes such as pinene; terpene resins; hydrogenated polyterpene resins; phenolic modified terpene resins and hydrogenated derivatives thereof; indene-coumarone resins; aliphatic petroleum hydrocarbon resins; hydrogenated aliphatic petroleum hydrocarbon resins; C5/C9 hydrocarbon resins, including cyclic or acyclic C5 resins and aromatic modified acyclic or cyclic resins, cyclic petroleum hydrocarbon resins and the hydrogenated derivatives, and the like. In one or more embodiments, tackifiers may be selected from hydrocarbon resins. In other embodiments tackifiers may be selected from commercially available hydrocarbon resins by Braskem such as resins from the UNILENE® family, including Unilene A80, Unilene A90, Unilene A100 or Unilene A120.

In one or more embodiments, hotmelt adhesive compositions may contain tackifiers in an amount ranging from a lower limit selected from one of 10 wt %, 15 wt %, 20 wt %, 25 wt %, 30 wt % and 40 wt % to an upper limit selected from one of 60 wt %, 70 wt %, 80 wt % and 90 wt % of the hotmelt adhesive composition, where any lower limit may be paired with any upper limit.

In one or more embodiments, tackifiers may be formulated as a concentrate, or "tackifier masterbatch" that is combined with other polymers and/or additives to prepare a hot melt composition. Tackifier masterbatches may be prepared in any conventional mixing process of resins, such as solubilization and extrusion processes. In one or more embodiments, tackifier masterbatches may be formulated with tackifier and any suitable base polymer having good compatibility with the other components of the hot melt adhesive composition. In particular embodiments the base polymer is an EVA copolymer.

Tackifier masterbatches in accordance with the present disclosure may contain tackifiers at a percent by weight (wt %) of the masterbatch that ranges from 20 wt % to 70 wt % and a base polymer at a percent by weight (wt %) of the masterbatch that ranges from 20 wt % to 70 wt %.

In one or more embodiments, a hot melt adhesive composition may be combined with a tackifier masterbatch at a percent by weight (wt %) of the adhesive composition that ranges from 20 wt % to 70 wt %.

Waxes

Hotmelt adhesive compositions in accordance with the present disclosure may optionally incorporate one or more waxes. Waxes suitable for use in the present invention include paraffin waxes, microcrystalline waxes, high density low molecular weight polyethylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes. Modified waxes, such as vinyl acetate modified and maleic anhydride modified waxes, may also be used. Example waxes useful in the practice of the invention will have a melting point of from about 64° C. to about 600° C. and will have an oil content of less that about 0.5.

Particular examples include paraffin waxes having a ring and ball softening point of about 55° C. to about 85° C. Exemplary paraffin waxes are Okerin® 236 TP available from Astor Wax Corporation, Doraville, Ga.; Penreco® 4913 available from Pennzoil Products Co., Houston, Tex.; R-7152 Paraffin Wax available from Moore & Munger, Shelton, CN.; and Paraffin Wax 1297 available from International Waxes, Ltd in Ontario, Canada. Particularly preferred are paraffin waxes having melting points in the range of about 130 to 165° F., such as, for example, Pacemaker available from Citgo, and R-2540 available from Moore and Munger; and low melting point synthetic Fischer-Tropsch waxes having a melting point of less than about 180° F. including Escorez series of available from ExxonMobil Chemical Company, Houston, Texas. The most preferred wax is paraffin wax with a melting point of 150° F. Other paraffinic waxes include waxes available from CP Hall under the product designations 1230, 1236, 1240, 1245, 1246, 1255, 1260, & 1262. CP Hall 1246 paraffinic wax is available from CP Hall (Stow, Ohio).

In one or more embodiments, hotmelt adhesive compositions may contain waxes in an amount ranging from a lower limit selected from one of 0.1 wt %, 0.5 wt %, 1 wt % and 5 wt % to an upper limit selected from one of 15 wt %, 20 wt %, 25 wt %, 30 wt %, 35 wt % and 40 wt % of the hotmelt adhesive composition, where any lower limit may be paired with any upper limit.

Antioxidants

Hotmelt adhesive compositions in accordance with the present disclosure may optionally incorporate one or more antioxidants. Antioxidants suitable for use in the present invention may include 4,4'-methylenebis(2,6-di-tert-butylphenol), 2,2'-methylenebis(4-methyl-6-tert-butylphenol), pentaerythritol tetraki s [3,(3,5-di-tert-butyl-4-hydroxyphenyl)propionate], phosphites including di-stearyl-3, 3'-thiodipropionate (DSTDP), tris-(p-nonylphenyl)-phosphite (TNPP), and bis(2,4-di-tert-butylphenyl)4,4'-diphenylene-diphosphonite. Antioxidants suitable for use in the present invention are commercially available under a variety of product designations including the IRGANOX series available from BASF Corporation, Florham Park, N.J., under the product designations of IRGANOX 1010, IRGANOX 565, IRGANOX 1076, and IRGAFOS 168.

In one or more embodiments, hotmelt adhesive compositions may contain antioxidants in an amount ranging from a lower limit selected from one of 0.01 wt %, 0.02 wt %, 0.03 wt %, 0.04 wt % and 0.05 wt % to an upper limit selected from one of 0.1 wt %, 0.2 wt %, 0.3 wt %, 0.4 wt %, 0.5 wt %, 1 wt %, 2 wt %, 3 wt %, 4 wt %, and 5 wt % of the hotmelt adhesive composition, where any lower limit may be paired with any upper limit.

Initiators for Free-Radical Polymerization

Hotmelt adhesive compositions in accordance with the present disclosure may include a polymer synthesized with one or more initiators for radical polymerization capable of generating free radicals that initiate chain polymerization of comonomers and prepolymers in a reactant mixture. In one or more embodiments, radical initiators may include chemical species that degrade to release free radicals spontaneously or under stimulation by temperature, pH, or other triggers.

In one or more embodiments, radical initiators may include peroxides and bifunctional peroxides such as benzoyl peroxide; dicumyl peroxide; di-tert-butyl peroxide; tert-butyl cumyl peroxide; t-butyl-peroxy-2-ethyl-hexanoate; tert-butyl peroxypivalate; tertiary butyl peroxyneodecanoate; t-butyl-peroxy-benzoate; t-butyl-peroxy-2-ethyl-hexanoate; tert-butyl 3,5,5-trimethylhexanoate peroxide; tert-butyl peroxybenzoate; 2-ethylhexyl carbonate tert-butyl peroxide; 2,5-dimethyl-2,5-di (tert-butylperoxide) hexane; 1,1-di (tert-butylperoxide)-3,3,5-trimethylcyclohexane; 2,5-dimethyl-2,5-di(tert-butylperoxide) hexyne-3; 3,3,5,7,7-pentamethyl-1,2,4-trioxepane; butyl 4,4-di (tert-butylperoxide) valerate; di (2,4-dichlorobenzoyl) peroxide; di(4-methylbenzoyl) peroxide; peroxide di(tert-butylperoxyisopropyl) benzene; and the like.

Radical initiators may also include benzoyl peroxide, 2,5-di(cumylperoxy)-2,5-dimethyl hexane, 2,5-di(cumylperoxy)-2,5-dimethyl hexyne-3,4-methyl-4-(t-butylperoxy)-2-pentanol, 4-methyl-4-(t-amylperoxy)-2-pentanol,4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di (t-amylperoxy)hexane, 2,5-dimethyl-2,5-di(t-butylperoxy) hexyne-3,2,5-dimethyl-2,5-di(t-amylperoxy)hexyne-3,2,5-dimethyl-2-t-butylperoxy-5-hydroperoxyhexane, 2,5-dimethyl-2-cumylperoxy-5-hydroperoxy hexane, 2,5-dimethyl-2-t-amylperoxy-5-hydroperoxyhexane, m/p-alpha, alpha-di[(t-butylperoxy)isopropyl]benzene, 1,3,5-tris(t-butylperoxyisopropyl)benzene, 1,3,5-tris(t-amylperoxyisopropyl)benzene, 1,3,5-tris(cumylperoxyisopropyl)benzene, di[1,3-dimethyl-3-(t-butylperoxy)butyl]carbonate, di[1,3-dimethyl-3-(t-amylperoxy)butyl]carbonate, di[1,3-dimethyl-3-(cumylperoxy)butyl]carbonate, di-t-amyl peroxide, t-amyl cumyl peroxide, t-butyl-isopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl]benzene, 1,3-dimethyl-3-(t- butylperoxy)butanol, 1,3-dimethyl-3-(t-amylperoxy)butanol, di(2-phenoxyethyl) peroxydicarbonate, di(4-t-butylcyclohexyl)peroxydicarbonate, dimyristyl peroxydicarbonate, dibenzyl peroxydicarbonate, di(isobomyl)peroxydicarbonate, 3-cumylperoxy-1, 3-dimethylbutyl methacrylate, 3-t-butylperoxy-1,3-dimethylbutyl methacrylate, 3-t-amylperoxy-1,3-dimethylbutyl methacrylate, tri(1,3-dimethyl-3-t-butylperoxy butyloxy)vinyl silane, 1,3-dimethyl-3-(t-butylperoxy)butyl N-[1-{3-(1-methylethenyl)-phenyl}1-methylethyl]carbamate, 1,3-dimethyl-3-(t-amylperoxy) butyl N-[1-{3(1-methylethenyl)-phenyl}-1-methylethyl] carbamate, 1,3-dimethyl-3-(cumylperoxy))butyl N-[1-{3-(1-methylethenyl)-phenyl}-1-methylethyl]carbamate, 1,1-di (t-butylperoxy)-3,3,5-trimethylcyclohexane, 1,1-di(t-butylperoxy)cyclohexane, n-butyl 4,4-di(t-amylperoxy) valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-butyl-4,4-bis(t-butylperoxy)valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methyl ethyl ketone peroxide cyclic trimer), methyl ethyl ketone peroxide cyclic dimer, 3,3,6,6, 9,9-hexamethyl-1,2,4,5-tetraoxacyclononane, 2,5-dimethyl-2,5-di(benzoylperoxy)hexane, t-butyl perbenzoate, t-butylperoxy acetate, t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butyl-peroxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl) monoperoxy carbonate, 1,1,1-tris[2-(t-butylperoxy-carbonyloxy)ethoxymethyl]propane, 1,1,1-tris [2-(t-amylperoxy-carbonyloxy)ethoxymethyl]propane, 1,1, 1-tris[2-(cumylperoxy-cabonyloxy)ethoxymethyl]propane, OO-t-amyl-O-isopropylmonoperoxy carbonate, di(4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide, and combinations thereof.

In one or more embodiments, radical initiators may include azo-compounds such as azobisisobutyronitrile (AIBN), 2,2'-azobis(amidinopropyl) dihydrochloride, and the like, azo-peroxide initiators that contain mixtures of peroxide with azodinitrile compounds such as 2,2'-azobis (2-methyl-pentanenitrile), 2,2'-azobis(2-methyl-butanenitrile), 2,2'-azobis(2-ethyl-pentanenitrile), 2-[(1-cyano-1-methylpropyl)azo]-2-methyl-pentanenitrile, 2-[(1-cyano-1-ethylpropyl)azo]-2-methyl-butanenitrile, 2-[(1-cyano-1-methylpropyl)azo]-2-ethyl, and the like.

In one or more embodiments, radical initiators may include Carbon-Carbon ("C—C") free radical initiators such as 2,3-dimethyl-2,3-diphenylbutane, 3,4-dimethyl-3,4-diphenylhexane, 3,4-diethyl-3,4-diphenylhexane, 3,4-dibenzyl-3,4ditolylhexane, 2,7-dimethyl-4,5-diethyl-4,5-diphenyloctane, 3,4-dibenzyl-3,4-diphenylhexane, and the like.

In one or more embodiments, hotmelt adhesive compositions in accordance with the present disclosure may include polymers synthesized with one or more radical initiators present at a percent by weight of the total polymerization mixture (wt %) that ranges from a lower limit selected from one of 0.000001 wt %, 0.0001 wt %, 0.01 wt %, 0.1 wt %, 0.15 wt %, 0.4 wt %, 0.6 wt %, 0.75 wt % and 1 wt %, to an upper limit selected from one of 0.5 wt %, 1.25 wt %, 2 wt %, 4 wt %, and 5 wt %, where any lower limit can be used with any upper limit. Further, it is envisioned that the concentration of the radical initiator may be more or less depending on the application of the final material.

Stabilizers

Hotmelt adhesive compositions in accordance with the present disclosure may include polymers with one or more stabilizers, present at a percent by weight of total polymerization mixture, capable of preventing polymerization in the feed lines of monomers and comonomers but not hindering polymerization at the reactor.

In one or more embodiments, stabilizers may include nitroxyl derivatives such as 2,2,6,6-tetramethyl-l-piperidinyloxy, 2,2,6,6-tetramethyl-4-hydroxy-l-piperidinyloxy, 4-oxo-2,2,6,6-tetramethyl-1-piperidinyloxy, 2,2,6,6-tetramethyl-4-amino-piperidinyloxy, and the like.

In one or more embodiments, polymers may be formed from one or more stabilizers present at a percent by weight of the total polymerization mixture (wt %) of one or more stabilizers that ranges from a lower limit selected from one of 0.000001 wt %, 0.0001 wt %, 0.01 wt %, 0.1 wt %, 0.15 wt %, 0.4 wt %, 0.6 wt %, 0.75 wt % and 1 wt %, to an upper limit selected from one of 0.5 wt %, 1.25 wt %, 2 wt %, 4 wt %, and 5 wt %, where any lower limit can be used with any upper limit. Further, it is envisioned that the concentration of the stabilizer may be more or less depending on the application of the final material.

Additives

Hotmelt adhesive compositions in accordance with the present disclosure may include fillers and additives that modify various physical and chemical properties when added to the hotmelt adhesive composition and/or the polymer during blending that include one or more polymer additives such as kickers, processing aids, lubricants, antistatic agents, clarifying agents, nucleating agents, beta-nucleating agents, slipping agents, antioxidants, antacids, light stabilizers such as HALS, IR absorbers, whitening agents, organic and/or inorganic dyes, anti-blocking agents, processing aids, flame-retardants, plasticizers, biocides, and adhesion-promoting agents.

Hotmelt adhesive compositions in accordance with the present disclosure may include one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS).

In one or more embodiments, hotmelt adhesive compositions in accordance with the present disclosure may contain a percent by weight of the total composition (wt %) of one or more additives and/or fillers that ranges from a lower limit selected from one of 0.01 wt %, 0.02 wt %, 0.05 wt %, 1.0 wt %, 5.0 wt %, 10.0 wt %, 15.0 wt %, and 20.0 wt %, to an upper limit selected from one of 25 wt %, 30 wt %, 40 wt %, 50 wt %, 60 wt %, and 70 wt %, where any lower limit can be used with any upper limit.

Physical properties of hotmelt adhesive compositions

In one or more embodiments, hotmelt adhesive compositions may have a viscosity according to ASTM D1084-08 at 150° C. in a range having a lower limit selected from any of 300 cPs, 500 cPs, 1000 cPs, 1500 cPs, 2500 cPs, 3000 cPs, 3500 cPs, and 4000 cPs, to an upper limit selected from any of 4500 cPs, 5000 cPs, 5500 cPs, 6000 cPs, 7000 cPs, 8000 cPs, 9000 cPs, 10000 cPs, and 20000 cPs where any lower limit may be paired with any upper limit.

In one or more embodiments, hotmelt adhesive compositions may have a viscosity according to ASTM D1084-08 at 177° C. in a range having a lower limit selected from any of 300 cPs, 500 cPs, 750 cPs, 1000 cPs, 1250 cPs, 1500 cPs, and 1750 cPs, to an upper limit selected from any of 2000 cPs, 3000 cPs, 4000 cPs, 5000 cPs, 6000 cPs, 7000 cPs, 8000 cPs, 9000 cPs and 10000 cPs, where any lower limit may be paired with any upper limit.

In one or more embodiments, hotmelt adhesive compositions may have a molten

Gardner color according to ASTM D1544-04 of 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3, 3.5, 4, 4.5, 5, 5.5, 6, 6.5, or 7.

In one or more embodiments, hotmelt adhesive compositions may have a peel adhesion fail temperature (PAFT) according to ASTM D4498-07 at 100 gram of at least 40° C., 50° C., 60° C. or 70° C. and a shear adhesion fail temperature (SAFT) according to ASTM D4498-07 at 500 gram of at least 70° C., 80° C. or 90° C.

A cloud point is the temperature which a transparent hot melt adhesive composition undergoes a phase separation and forms a cloudy appearance. In one or more embodiments, the hotmelt adhesive composition may have a cloud point according to ASTM D6038 in a range having a lower limit selected from any of 30° C., 40° C., 50° C., 60° C., 70° C., 80° C., to an upper limit selected from any of 90° C., 100° C., 110° C., 120° C., 130° C., or 140° C., where any lower limit may be paired with any upper limit. In one or more embodiments, the hot melt adhesive composition does not exhibit a cloud point, and therefore, a cloud point does not exist, which indicates that the components are highly compatible with each other.

Thermal stability of an adhesive composition may be characterized in accordance with test methods such as ASTM D4499. Parameters such as viscosities, viscosity change and color after stored for 100 hours and 200 hours are tested to determine the thermal stability. In one or more embodiments, the hotmelt adhesive composition may have a 100-hour viscosity according to ASTM D4499 at 177° C. in a range having a lower limit selected from any of 300 cPs, 500 cPs, 750 cPs, 1000 cPs, 1250 cPs, 1500 cPs, and 1750 cPs, to an upper limit selected from any of 2000 cPs, 3000 cPs, 4000 cPs, 5000 cPs, 6000 cPs, 7000 cPs, 8000 cPs, 9000 cPs and 10000 cPs, where any lower limit may be paired with any upper limit.

In one or more embodiments, the hotmelt adhesive composition may have a 200-hour viscosity according to ASTM D4499 at 177° C. in a range having a lower limit selected from any of 300 cPs, 500 cPs, 750 cPs, 1000 cPs, 1250 cPs, 1500 cPs, and 1750 cPs, to an upper limit selected from any of 2000 cPs, 3000 cPs, 4000 cPs, 5000 cPs, 6000 cPs, 7000 cPs, 8000 cPs, 9000 cPs and 10000 cPs, where any lower limit may be paired with any upper limit.

In one or more embodiments, the hotmelt adhesive composition may have a 100-hour viscosity change according to ASTM D4499 in a range having a lower limit selected from any of 0%, 0.5%, 1%, 2%, and 3%, to an upper limit selected from any of 15%, 17.5%, 20%, 25%, 30%, 40%, 50%, 60% and 70%, where any lower limit may be paired with any upper limit. In one or more embodiments, the hotmelt adhesive composition may have a 200-hour viscosity change according to ASTM D4499 in a range having a lower limit selected from any of 0%, 0.5%, 1%, 2%, and 3%, to an upper limit selected from any of 15%, 17.5%, 20%, 25%, 30%, 40%, 50%, 60% and 70%, where any lower limit may be paired with any upper limit. The 100-hour viscosity change and 200-hour viscosity change may be a positive or negative change, and the aforementioned % viscosity change represents the absolute value of either the positive or negative change.

In one or more embodiments, hotmelt adhesive compositions may have a 100-hour
Gardner color according to ASTM D4499 and ASTM D1544-04 in a range having a lower limit selected from any of 2, 3, 4, 5, 6, 7, 8, and 8.5, to an upper limit selected from any of 9, 9.5, 10, 10.5, 11, 11.5, 12, 12.5, 13, 14, 15, 16 and 17 where any lower limit may be paired with any upper limit. In one or more embodiments, the hotmelt adhesive compositions may have a 200-hour Gardner color according to ASTM D4499 and ASTM D1544-04 in a range having a lower limit selected from any of 2, 3, 4, 5, 6, 7, 8, and 8.5, to an upper limit selected from any of 9, 9.5, 10, 10.5, 11, 11.5, 12, 12.5, 13, 14, 15, 16 and 17 where any lower limit may be paired with any upper limit.

In one or more embodiments, hotmelt adhesive compositions may be free of an edge ring after storing at 177° C. for 100-hour and/or 200-hour according to ASTM D4499.

In one or more embodiments, hotmelt adhesive compositions may have a glass transition temperature ($T_g$) measured by dynamic mechanical analysis (DMA) or differential scanning calorimetry (DSC) in a range having an upper limit selected from any 100° C., 90° C., and 80° C., to a lower limit selected from any of −50° C., −60° C., and −70° C., where any lower limit may be paired with any upper limit. The maximum observed in the Tan δ vs. temperature plot of hotmelt adhesive compositions obtained from the DMA measurement may exhibit 1, 2, or 3 maximums in the range of −70° C. to 70° C., where the maximums may have a lower limit selected from any of 0.05, 0.1, 0.2, 0.3, 0.4, and 0.5, to an upper limit selected from any of 1, 2, 3, 4, 5, 6, 7, 8, 9, and 10, where any lower limit may be paired with any upper limit.

Physical Properties of Polymers

In one or more embodiments, hotmelt adhesive composition may include polymers with a melt flow rate (MFR) according to ASTM D1238 at 190° C./2.16 kg in a range having a lower limit selected from any of 0.01 g/10 min, 0.5 g/10 min, 1 g/10 min, 10 g/10 min, 70 g/10 min, 80 g/10 min, 90 g/10 min, and 100 g/10 min to an upper limit selected from any of 140 g/10 min, 150 g/10 min, 160 g/10 min, 170 g/10 min, 200 g/10 min 350 g/10 min, 450 g/10 min, 550 g/10 min, 1000 g/10 min, and 2000 g/10 min where any lower limit may be paired with any upper limit.

In one or more embodiments, hotmelt adhesive composition may include polymers with crystallinity measured according to ASTM D3418 by differential scanning calorimetry (DSC) or wide angle X-ray diffraction (WAXD) in a range having a lower limit selected from any 0.1%, 1%, 10%, and 20%, to an upper limit selected from any of 60%, 70%, and 80%, where any lower limit may be paired with any upper limit.

In one or more embodiments, hotmelt adhesive compositions may include polymers with a glass transition temperature ($T_g$) measured by dynamic mechanical analysis (DMA) or according to ASTM D3418 by DSC in a range having an upper limit selected from any 100° C., 90° C., and 80° C., to a lower limit selected from any of −50° C., −60° C., and −70° C., where any lower limit may be paired with any upper limit.

In one or more embodiments, hotmelt adhesive compositions may include polymers with a melting temperature ($T_m$) measured according to ASTM D3418 by DSC in a range having a lower limit selected from any of 0° C., 10° C., 20° C., 30° C., and 40° C., to an upper limit selected from any of 100° C., 110° C., 120° C., 130° C., 140° C., and 150° C., where any lower limit may be paired with any upper limit. In one or more embodiments, hotmelt adhesive compositions may include polymers that may not present a $T_m$, characterizing a completely amorphous polymer composition.

In one or more embodiments, hotmelt adhesive compositions may include polymers with a crystallization temperature ($T_a$) measured according to ASTM D3418 by DSC in a range having a lower limit selected from any 0° C., 5° C., 10° C., 20° C., 30° C., and 40° C. and to an upper limit selected from any of 80° C., 90° C., 100° C., 110° C., 120° C., 130° C., 140° C., and 150° C., where any lower limit may be paired with any upper limit.

In one or more embodiments, hotmelt adhesive compositions may include polymers with a heat of crystallization measured according to ASTM D3418 by DSC in a range having a lower limit of any of 0, 10, 20, 30, 40, 50, and 60 J/g, and an upper limit of any of 140, 180, 200, 240, and 280 J/g, where any lower limit may be paired with any upper limit.

The polymerization conditions result in the production of polymers having a wide range of molecular weight distribution (MWD). In one or more embodiments, hotmelt adhesive compositions may include polymers with the MWD obtained within this polymerization method from about 1 to about 60, with a lower limit of any of 1, 1.5, 3, 5, or 10, and an upper limit of any of 10, 20, 30, 40, 50, or 60, where any lower limit can be used in combination with any upper limit. However, depending on the amount of comonomer incorporated, samples produced under high-pressure conditions show a broad range of MWDs from about 1 to 60. Copolymers and terpolymers produced under low-pressure conditions may exhibit number average molecular weights of 1 to 300 kDa, weight average molecular weights of 1 to 1000 kDa and MWDs of 1 to 60. On the other hand, copolymers and terpolymers produced under high-pressure conditions may show number average molecular weights of 1 to 10000 kDa, weight average molecular weights of 1 to 20000 kDa and MWDs of 1 to 60.

In one or more embodiments, hotmelt adhesive compositions may include polymers having a hardness as determined according to ASTM D2240 in a range having a lower limit selected from any 25, 35, and 45 Shore A, to an upper limit selected from any of 80, 90, and 100 Shore A, where any lower limit may be paired with any upper limit.

In one or more embodiments, hotmelt adhesive compositions may include polymers having a hardness as determined according to ASTM D2240 in a range having a lower limit selected from any 10, 20, and 30 Shore D, to an upper limit selected from any of 50, 60, and 70 Shore D, where any lower limit may be paired with any upper limit.

In one or more embodiments, hotmelt adhesive compositions may include polymers having a percent elongation, tensile strength, and modulus as determined according to ASTM D368 in a range having a lower limit selected from any 10, 50, and 100 percent elongation, to an upper limit selected from any of 500, 1000, and 2000 percent elongation, a lower limit selected from any 1, 5, and 10 MPa tensile strength, to an upper limit selected from any of 15, 30, 70, 100, and 500 MPa tensile strength, a lower limit selected from any 0.1, 1, 5, 20, and 40 MPa modulus, to an upper limit selected from any of 100, 200, 300, 1000, and 5000 MPa modulus, and where any lower limit may be paired with any upper limit.

In one or more embodiments, hotmelt adhesive compositions may include polymers with a density according to ASTM D792 in a range having a lower limit selected from any of 0.75 g/cm³, 0.85 g/cm³, and 0.89 g/cm³, to an upper limit selected from any of 1.1 g/cm³, 1.2 g/cm³, 1.3 g/cm³, and 1.5 g/cm³, where any lower limit may be paired with any upper limit.

In one or more embodiments, hotmelt adhesive compositions may include polymers with a bio-based carbon content, as determined by ASTM D6866-18 Method B, in a range having a lower limit selected from any of 1%, 5%, 10%, and 20%, to an upper limit selected from any of 60%, 80%, 90%, and 100%, where any lower limit may be paired with any upper limit.

In one or more embodiments, long chain branching average LCBf may be calculated from GPC analysis using a GPC instrument equipped with IRS infrared detector and a four-capillary viscometry detector, both from Polymer Char. Data collection was performed using Polymer Char's software. The concentration measured by IRS detector was calculated considering that the whole area of the chromatogram was equivalent to the elution of 100% of the mass injected. Average LCBf was then calculated according to:

$$LCBf = \frac{1000 B_n R}{M_w}$$

where R is the molar mass of the repeated unit and is calculated based on the contribution of monomer and comonomers, considering the mol percentage of each one, determined by NMR. $M_w$ is the weight average molecular weight and is calculated according to the following equation by means of universal calibration:

$$M_w = \left[\frac{\sum (N_i M_i^2)}{\sum (N_i M_i)}\right]$$

Average $B_n$ constant is calculated according to:

$$g = \left[\left(1 + \frac{B_n}{7}\right)^{1/2} + \frac{4 B_n}{9\pi}\right]^{-1/2}$$

Average g' and g constants are calculated according to:

$$g' = \frac{IV_{Branched}}{IV_{Linear}} \quad g' = g^\varepsilon$$

ε is known as the viscosity shielding ratio and is assumed to be constant and equal to 0.7.

The intrinsic viscosity of the branched samples ($IV_{branched}$) may be calculated using the specific viscosity ($\eta_{sp}$) from the viscometer detector as follows.

$$IV_{branched} = \frac{\sum_i (\eta_{sp})_i \Delta V_i}{SA} \frac{1}{10 KIV}$$

where SA is sample amount, KIV is viscosity detector constant and the volume increment ($\Delta V$) is a constant determined by the difference between consecutive retention volumes ($\Delta V = RV_{i+1} - RV_i$).

The intrinsic viscosity of the linear counterpart ($W_{linear}$) may be calculated using Mark-Houwink equation, whereas the Mark-Houwink constants are obtained from the intrinsic viscosity considering the concentration from Stacy-Haney method as follows.

The Stacey-Haney IV ($IV_{SH}$) is calculated based on Stacy-Haney concentration by $IV_{SH_i}=$ $$\frac{1}{KIV} \frac{\eta_{sp_i}}{C_{SH_i}},$$

where $C_{SH}$ is found from $$C_{SHi} = \frac{(\ln \eta_{rel})_i K}{(hv)_i^{a/a+1}}$$

whereas $\eta_{rel}$ is the relative viscosity ($\eta_{rel}=\eta_{sp}+1$) $(hv)_i$ is the hydrodynamic volume at each elution volume slice from the universal calibration curve and the Mark-Houwink exponent, a, was defined as 0.725, reference value for a linear polyethylene homopolymer and the constant, K, is calculated according to:

$$K = \frac{\frac{SA}{\Delta V}}{\sum \frac{(\ln \eta_{rel})_i}{(hv)_i^{a/a+1}}}$$

From $IV_{SH_i}$ the molecular weight ($M_{SH}$) on each elution volume slice is also obtained according to $$M_{SH_i} = \frac{hv_i}{IV_{SH_i}}$$

Plotting $IV_{SH_i}$ versus $M_{SH_i}$, both in log scale, leads to Mark-Houwink constants k and α for the linear polymer. Finally, $IV_{linear}$ may be calculated as:

$$IV_{linear} = k M_v^a$$

where $M_v$ is the viscosity average molecular weight by means of universal calibration and the concentration by IR5 infrared detector, and is calculated according to:

$$M_v = \left[\frac{\sum(N_i M_i^{a+1})}{\sum(N_i M_i)}\right]^{1/a}$$

where $N_i$ is the number of ith molecules with molecular weight of $M_i$. The $M_i$ is obtained considering the concentration by IR5 infrared detector and the hydrodynamic volume from $$\left(M_i = \frac{hv_i}{\frac{1}{KIV}\frac{\eta_{sp_i}}{c_{IR_i}}}\right).$$

the universal calibration $M_i$ is plotted against the retention volume, the noisy extremes of the curve are removed and then extrapolated using a third order fit polynomial. The equation derived from this 3° order fit polynomial is used to calculate the $M_i$ as a function of retention volume. In one or more embodiments, polymers may have a long chain branching frequency, calculated by GPC analysis, ranging from 0 to 10, such as from a lower limit of any of 1, 0.5, 1, or 1.5 and an upper limit of any of 2, 4, 6, 8, or 10, where any lower limit may be paired with any upper limit.

In one or more embodiments, the polymers may have a long chain branching content, measured by $^{13}$CNMR, ranging from 0 to 10, such as a lower limit of any of 0, 0.2, 0.4, 0.6, 0.8, or 1 and an upper limit of any of 2, 4, 6, 8, or 10, where any lower limit may be paired with any upper limit.

In $^{13}$CNMR analysis, long chain branching (LCB) is defined as any branch with six or more carbons. Based on $^{13}$CNMR spectra, LCB content ($B_{6+}$) in branched polymers is calculated from:

$$B_{6+} = S_{3,Polymer} - S_{3,vinyl\ ester\ monomers}$$

where the $S_3$ peak is positioned at 32.2 ppm on a $^{13}$CNMR spectrum. This method takes into account both branches ($B_{6+}$) and the chain ends of the main chain, where the effect of the long branches in the vinyl ester monomer is corrected using its $^{13}$CNMR spectrum, and the effect of chain ends can also be corrected with GPC data.

In one or more embodiments, the polymers may have, after thermal fractionation by successive self-nucleation and annealing (SSA), a heat flow versus temperature curve that has 0 to 20 minimums, such as a lower limit of any of 0, 1, 2, 3, 4, 5, 6, 7, 8, 9, or 10 minimums and an upper limit of any of 12, 14, 16, 18, or 20 minimums, where any lower limit may be paired with any upper limit, where the minimums may be allocated in the temperature ranges of 140-150° C., 130-140° C., 120-130° C., 110-120° C., 100-110° C., 90-100° C., 80-90° C., 70-80° C., 60-70° C. 50-60° C., 40-50° C., 30-40° C., 20-30° C., 10-20° C., and/or 0-10° C. Such thermal fractionation may use a temperature protocol (a series of heating and cooling cycles) to produce a distribution of lamellar crystals whose sizes reflect the distribution of methyl sequence lengths in the copolymers and terpolymers. The thermal fractionation may be carried out in a TA Instruments Discovery DSC 2500, under nitrogen. All cooling cycles may be carried out at 5° C./min, and heating cycles may be carried out at 20° C./min. Samples may be heated from 25° C. to 150° C., held at 150° C. for 5 min, cooled to 25° C. and held at this temperature for 3 min. The sample may subsequently be heated to the first annealing temperature (140° C.), held at this temperature for 5 min and cooled to 25° C. The sample may then be heated again to the next annealing temperature (130° C.), held at this temperature for 5 min and cooled to 25° C. The procedure may be repeated in steps of 10° C. until the last annealing temperature (such as, but not limited to, 0° C.) is reached. Then, the sample may be heated to 150° C., at 20° C./min in order to obtain the melting profile.

In one or more embodiments, the polymers may have a thermal stability, measured by thermal gravimetric analysis (TGA), where the ratio of weight loss between 250 to 400° C. relative to the total comonomer content ranges from 0 to 2, such as a lower limit of any of 0, 0.1, 0.2, 0.3, 0.4, 0.5, 0.6, 0.7, 0.8, 0.9, and 1, and an upper limit of any of 1.2, 1.4, 1.6, 1.8, or 2, where any lower limit may be paired with any upper limit.

In one or more embodiments, the polymers may have a storage modulus at 0° C. of 0.1 MPa to 10 GPa, such as a lower limit of any of 0.1, 1, 2, 5, 10, 20, 40, 60, 80, or 100 MPa, and an upper limit of any of 200 MPa, 300 MPa, 400 MPa, 500 MPa, 700 MPa, 1 GPa, 5 GPa, or 10 GPa, where any lower limit may be paired with any upper limit.

In one or more embodiments, the polymers may have 1 to 2 relaxation maximums in the tan δ versus temperature plot between −75 to 75° C. where the peak at the higher temperature is designated as α and the peak at lower temperature is designated as β. In one or more embodiments, $T_\alpha$ (temperature corresponding to the α peak) may vary between −75 to 75° C., such as a lower limit of any of −75, −60, −50, −40, −30, −20, −10, or 0° C., and an upper limit of any of 10, 20, 30, 40, 50, 60, or 75° C., where any lower may be paired with any upper limit. In one or more embodiments, $T_\beta$ (temperature corresponding to the β peak) may vary between −75 to 50° C., such as a lower limit of any of −75, −60, −50, −40, −30, −20, −10, or 0° C., and an upper limit of any of 10, 20, 30, 40, or 50° C., where any lower may be paired with an upper limit.

Hotmelt Adhesive Composition Preparation Methods

Hotmelt adhesive compositions in accordance with the present disclosure may be prepared in any conventional batch, semi-batch, or continuous mixing devices. In one or more embodiments, hotmelt adhesive composition may be prepared by mixing, which may include melt-mixing, in any known processes for adhesive formulation such as Sigma mixers, horizontal mixers, kneaders, blenders, Banbury mixers, mixing rollers, extruders, and any other available manufacturing processes.

In one or more embodiments, all components may be mixed together in a single step. In other embodiments, when more than one polymer is present in the hotmelt adhesive composition, there may be a pre-mixture step of the polymers in a conventional mixture device, such as in extruders, alternatively being pelletized, prior to a mixture with other components in a subsequent mixture step.

In one or more embodiments, hotmelt adhesive compositions may be mixed at a temperature in a range having a lower limit selected from any of 100° C., 110° C., 120° C., 130° C., 140° C. and 150° C. to an upper limit selected from any of 180° C., 190° C., 200° C., 210° C. and 220° C., where any lower limit may be paired with any upper limit.

Polymer Preparation Methods

In one or more embodiments, polymers in the hotmelt adhesive compositions in accordance with the present disclosure may be prepared in reactor by polymerizing ethylene and one or more branched vinyl esters monomers. Methods of reacting the comonomers in the presence of a radical initiator may include any suitable method in the art including solution phase polymerization, pressurized radical polymerization, bulk polymerization, emulsion polymerization, and suspension polymerization. In one or more embodiments, the reactor may be a batch or continuous reactor at pressures below 500 bar, known as low pressure polymerization system. In one or more embodiments, the reaction is carried out in a low pressure polymerization process wherein the ethylene and one or more vinyl ester monomers are polymerized in a liquid phase of an inert solvent and/or one or more liquid monomer(s). In one embodiment, polymerization comprises initiators for free-radical polymerization in an amount from about 0.0001 to about 0.01 millimoles calculated as the total amount of one or more initiator for free-radical polymerization per liter of the volume of the polymerization zone. The amount of ethylene in the polymerization zone will depend mainly on the total pressure of the reactor in a range from about 20 bar to about 500 bar and temperature in a range from about 20° C. to about 300° C. In one or more embodiments, the pressure in the reactor may have a lower limit of any of 20, 30, 40, 50, 75, or 100 bar, and an upper limit of any of 100, 150, 200, 250, 300, 350, 400, 450, or 500 bar and the temperature in the reactor may have a lower limit of any of 20° C., 50° C., 75° C. or 100° C., and an upper limit of any of 150° C., 200° C., 250° C., 300° C. The liquid phase of the polymerization process in accordance with the present disclosure may include ethylene, one or more vinyl ester monomer, initiator for free-radical polymerization, and optionally one or more inert solvent such as tetrahydrofuran (THF), chloroform, dichloromethane (DCM), dimethyl sulfoxide (DMSO), dimethyl carbonate (DMC), hexane, cyclohexane, ethyl acetate (EtOAc) acetonitrile, toluene, xylene, ether, dioxane, dimethyl-formamide (DMF), benzene or acetone. Copolymers and terpolymers produced under low-pressure conditions may exhibit number average molecular weights of 1 to 300 kDa, weight average molecular weights of 1 to 1000 kDa and MWDs of 1 to 60.

In one or more embodiments, the comonomers and one or more free-radical polymerization initiators are polymerized in a continuous or batch process at temperatures above 50° C. and at pressures above 1000 bar, known as high pressure polymerization systems. For example, a pressure of greater than 1000, 1100, 1200, 1500, 1600, 1700, 1800, 1900, 2000, 2100, 2200, 2300, 2400, 2500, 3000, 5000, or 10000 bar may be used. Copolymers and terpolymers produced under high-pressure conditions may have number average molecular weights (Mn) of 1 to 10000 kDa, weight average molecular weights (Mw) of 1 to 20000 kDa. Molecular weight distribution (MWD) is obtained from the ratio between the weight average molecular weight (Mw) and the number average molecular weight (Mn) obtained by GPC. Copolymers and terpolymers produced under high-pressure conditions may have MWDs of 1 to 60.

In one or more embodiments, the conversion during polymerization in low pressure polymerization and high pressure polymerization systems, which is defined as the weight or mass flow of the produced polymer divided by the weight of mass flow of monomers and comonomers may have a lower limit of any of 0.01%, 0.1%, 1%, 2%, 5%, 7%, 10% and an upper limit of any of 15%, 17%, 20%, 25%, 30%, 35%, 40%, 45%, 50%, 60%, 70%, 80%, 90%, 99% or 100%.

Multi-layer structures

Hotmelt adhesives compositions in accordance with the present disclosure may be used to generate multi-layer structures or multi-layer articles by bonding similar or dissimilar substrates. While there are no practical limits on the type of substrate that may be bonded using the hotmelt adhesive compositions in accordance with the present disclosure, exemplary substrates may include fabrics, non-woven materials, polymers and polymeric materials such as polyurethane, ethylene vinyl acetate copolymer (EVA), polypropylene, polyethylene, polyvinylchloride, polyester, polyamide, polyolefin, polyacrylic, polystyrene, metals, cellulosics such as wood, cardboard, paper, kraft and the like. Substrates may take the form of films, blocks, sheets, fiber, thread, strip, ribbon, coating, foil, band, and the like.

In one or more embodiments, methods of bonding a substrate to a similar or dissimilar substrate may include applying the hotmelt adhesive composition to at least one substrate and bonding the layers together. For example, the adhesive composition may be melted and applied to the at least one substrate to which it is being bound. Application onto the substrate may be, for example, by use of a calender, a laminator (such as a flat bed laminator), by various welding techniques, or by various batch processes which may use a variety of heat sources.

One or more embodiments of the present disclosure are also directed to multi-layer articles that may contain at least one layer of the hotmelt adhesive compositions and one or more substrate layers. The substrate layers of the multi-layer articles may be made from fabrics, non-woven materials, polymers and polymeric materials such as polyurethane, ethylene vinyl acetate copolymer (EVA), polypropylene, polyethylene, polyvinylchloride, polyester, polyamide, polyolefin, polyacrylic, polystyrene, metals, cellulosics such as wood, cardboard, paper, kraft and the like.

In one or more embodiments, multi-layer articles in accordance with the present disclosure may include hot melt adhesive compositions with bio-based carbon contents to bond one or more substrate layers together. In one or more embodiments, methods of bonding a substrate to a similar or dissimilar substrate may include applying a hot melt adhesive composition with bio-based carbon contents to at least one substrate and bonding the layers together.

EXAMPLES

The following examples are merely illustrative, and should not be interpreted as limiting the scope of the present disclosure. Ethylene-based polymers incorporating various amounts of vinyl acetate and a vinyl carbonyl monomer VeoVa™ 10 from HEXION™ (a mixture of isomers of vinyl esters of versatic acid having a carbon number of 10) under high-pressure conditions were produced to assay a number of polymer properties for the resulting compositions.

Ethylene, VeoVa™ 10 (Hexion), tertbutylperoxy-2-ethylhexanoate, heptane (99%, Sigma Aldrich), and vinyl acetate (99%, Sigma Aldrich) were used as received. Synthesis of copolymers and terpolymers with ethylene, VeoVa™ 10 and optionally vinyl acetate were performed under high-pressure conditions.

Example 1

A Polymer composition was prepared using a continuous free radical polymerization of the comonomer mixtures by combining different flows of ethylene, vinyl acetate, VeoVa™ 10, heptane and tertbutylperoxy-2-ethylhexanoate into a high-pressure reactor. Before each round of polymerization, the reactor was purged five times with 2200-2300 bars of ethylene. Each reaction began by heating the reactor to 200° C. and feeding ethylene to a pressure of 1900-2000 bar. A continuous flow of ethylene with a rate of 2000 g/hr was then fed into the reactor. Once the targeted pressure and stable ethylene flow was achieved, the comonomers were added to the reactor. The mixture of initiator and heptane was introduced to the system at a flow rate of 2 mL/hr. The reaction mixtures was collected and the reactor was washed with xylene at 145° C. The resulting polymer was dissolved in xylene and precipitated into cold methanol, then vacuum filtered. The resulting polymer contained 77.6 wt % ethylene and 22.4 wt % VeoVa™ 10.

Example 2

A polymer composition was prepared as described in EXAMPLE 1 except the comonomer mixture in continuous polymerization was varied. The resulting polymer contained 70.4 wt % ethylene, 21.2 wt % vinyl acetate and 8.4 wt % VeoVa™ 10.

Example 3

A polymer composition was prepared as described in EXAMPLE 1 except the comonomer mixture in continuous polymerization was varied. The resulting polymer contained 69.2 wt % ethylene, 25.8 wt % vinyl acetate and 5 wt % VeoVa™ 10.

Comparative Example 1

COMPARATIVE EXAMPLE 1 is a commercial resin produced by Braskem,
HM2528, which is a copolymer of ethylenevinyl acetate (EVA) with high vinyl-acetate content for specialty compounding applications and hot melt adhesives. The resin present low viscosity and excellent compatibility with adhesives resins and waxes. In addition, it delivers excellent load properties with any kind of fillers. This polymer contains 72 wt % ethylene and 28 wt % vinyl acetate.

Comparative Example 2

COMPARATIVE EXAMPLE 2 is a commercial resin produced by Braskem,
HM150, which is a copolymer of ethylenevinyl acetate (EVA) designed for variety hot melt applications. The resin combine moderately low viscosity and excellent adhesive property. HM150 is highly compatible with most tackifying resins and waxes. This polymer contains 80 wt % ethylene and 20 wt % vinyl acetate.

Comparative Example 3

COMPARATIVE EXAMPLE 3 is a blend of samples used in COMPARATIVE
EXAMPLE 1 and COMPARATIVE EXAMPLE 2. The components of the blends were mixed in such composition (19.6 wt % of COMPARATIVE EXAMPLE 1 and 80.4 wt % of COMPARATIVE EXAMPLE 2) so that the resulting blend has a melt flow index of 115 g/10 min at 190° C./2.16 kg.

Table 1 provides a summary of chemical compositions and the melt flow rates for all synthesized copolymers and terpolymers. The MFR was determined according to ASTM D 123 8 at 190° C./2.16 kg.

TABLE 1

| | Ethylene (wt %)[a,b] | Vinyl Acetate (wt %)[a,b] | VeoVa™10 (wt %)[a,b] | MFR (g/10 min)[c] |
|---|---|---|---|---|
| EXAMPLE 1 | 77.6 | 0 | 22.4 | 118 |
| EXAMPLE 2 | 70.4 | 21.2 | 8.4 | 150 |
| EXAMPLE 3 | 69.2 | 25.8 | 5 | 95 |
| COMPARATIVE EXAMPLE 1 | 72 | 28 | 0 | 20 |
| COMPARATIVE EXAMPLE 2 | 72 | 28 | 0 | 138.8 |
| COMPARATIVE EXAMPLE 3 | 72 | 28 | 0 | 115 |

[a]Determined from $^1$H NMR;
[b]Determined from $^{13}$C NMR;
[c]Measured based on ASTM D1238 at 190° C./2.16 kg.

Preparation of hotmelt adhesive compositions

Example 4

A hotmelt adhesive composition was prepared by adding 66 g of the polymer composition obtained in EXAMPLE 1, 85.4 g of Escorez™ 5637 tackifier, 44 g of Sasol™ H1 wax and 0.6 g of Irganox™ 1010 antioxidant into a metal container and stored in an oven at 177° C. for 1 hr. The melted ingredients were then transferred to a mixer and mixed at 177° C. for 15 minutes.

Example 5

A hotmelt adhesive composition was prepared as described in EXAMPLE 4 except the polymer composition obtained in EXAMPLE 1 was replaced with the polymer composition obtained in EXAMPLE 2.

Example 6

A hotmelt adhesive composition was prepared as described in EXAMPLE 4 except the polymer composition obtained in EXAMPLE 1 was replaced with the polymer composition obtained in EXAMPLE 3.

Comparative Example 4

A hotmelt adhesive composition was prepared as described in EXAMPLE 4 except the polymer composition obtained in EXAMPLE 1 was replaced with the polymer composition of COMPARATIVE EXAMPLE 1.

Comparative Example 5

A hotmelt adhesive composition was prepared as described in EXAMPLE 4 except the polymer composition obtained in EXAMPLE 1 was replaced with the polymer composition of COMPARATIVE EXAMPLE 2.

Comparative Example 6

A hotmelt adhesive composition was prepared as described in EXAMPLE 4 except the polymer composition obtained in EXAMPLE 1 was replaced with the polymer composition obtained in COMPARATIVE EXAMPLE 3.

Table 2 shows the wt % ratios of each component used to produce the hotmelt adhesive compositions of EXAMPLE 4 to 6 and COMPARATIVE EXAMPLE 4 to 6. As illustrated in Table 2, quantities of all components were kept consistent and only the type of commercial and synthesized copolymers and terpolymers were varied. The formulation shown in Table 2 is a standard formulation for a packaging type of hotmelt adhesive.

TABLE 2

| Components | Content (wt %) |
|---|---|
| Polymer compositions (EXAMPLE 1-3, COMPARATIVE EXAMPLE 1-3) | 33 |
| Tackifier (Escorez ™ 5637) | 44.7 |
| Wax (Sasol ™ H1) | 22 |
| Antioxidant (Irganox ™ 1010) | 0.3 |

Table 3 provides a summary of various hotmelt adhesive composition properties.

The viscosity of EXAMPLE 4-6 and COMPARATIVE EXAMPLE 4-6 at 150° C. and 177° C. was determined according to ASTM D1084-08. The results indicate that shear adhesion fail temperature (SAFT) was determined according to ASTM D4498-07.

Cloud point of COMPARATIVE EXAMPLE 4-6 was determined according to ASTM D6038. A cloud point is the temperature which a transparent solution undergoes a phase separation and forms a cloudy appearance. As illustrated in Table 3, COMPARATIVE EXAMPLE 4-6 showed cloud points of 107° C., 101° C. and 104° C.

Thermal stability of the hotmelt adhesive composition of EXAMPLE 4-6 and COMPARATIVE EXAMPLE 4-6 were determined by measuring 100-hour viscosity, 100-hour color and percent viscosity change in accordance with ASTM D4499. Parameters such as viscosities, viscosity change and color after stored for 100 hours are tested to determine the thermal stability.

TABLE 3

| | EXAMPLE 4 | EXAMPLE 5 | EXAMPLE 6 | COMPARATIVE EXAMPLE 4 | COMPARATIVE EXAMPLE 5 | COMPARATIVE EXAMPLE 6 |
|---|---|---|---|---|---|---|
| Viscosity 150° C. (cPS) | 3860 | 4770 | 5230 | 11200 | 3395 | 4180 |
| Viscoisty 177° C. (cPS) | 1758 | 2125 | 2350 | 4760 | 1535 | 1885 |
| Molten Garner Color | 2 | 2 | 2 | 2 | 1 | 1 |
| PAFT 100 g (° C.) | 76 | 75 | 76 | 71 | 72 | 71 |
| SAFT 500 g (° C.) | 94 | 95 | 97 | 95 | 95 | 96 |
| Cloud Point (° C.) | N/A | N/A | N/A | 107 | 101 | 104 |
| 100 hr Viscosity 177° C. (cPS) | 1828 | 2255 | 2780 | 4630 | 1600 | 1910 |
| 100 hr color | 10 | 9 | 9 | 10 | 10 | 9 |
| 100 hr % viscosity change | 3.53 | 6.12 | 18.3 | −2.73 | 4.23 | 1.33 |
| | | | | Slight edge ring | | | hotmelt adhesive compositions of EXAMPLE 4-6, which contain a copolymer of ethylene and branched vinyl ester monomers, or a terpolymer of ethylene, vinyl acetate and branched vinyl ester monomers, have lower viscosity than the hotmelt adhesive compositions of COMPARATIVE EXAMPLE 4-6, which do not contain branched vinyl ester monomers.

Molten Garner color of EXAMPLE 4-6 and COMPARATIVE EXAMPLE 4-6 was determined according to ASTM 1544-04, and peel adhesion fail temperature (PAFT) and Examples 7-11

EXAMPLES 7-11 are exemplary terpolymers of one or more embodiments produced in an industrial plant that normally operates producing EVA copolymers. EVA with 28 wt % VA being produced was transitioned to the terpolymer by adjusting the reactor parameters and gradually replacing the vinyl acetate feed stream with VeoVa 10™ until the desired comonomers ratios were obtained. The general reactor conditions for the production of the aforementioned terpolymers are provided in Table 4.

TABLE 4

| Parameter | EXAMPLE 7 | EXAMPLE 8 | EXAMPLE 9 | EXAMPLE 10 | EXAMPLE 11 |
|---|---|---|---|---|---|
| Pressure reactor 1 (kgf/cm$^2$) | 1820-1840 | 1820-1840 | 1820-1840 | 1820-1840 | 1820-1840 |
| Temperatures reactor 1 (° C.) | 164.5 | 164.5 | 164.5 | 164.5 | 164.5 |
| Pressure reactor 2 (kgf/cm$^2$) | 1780-1800 | 1780-1800 | 1780-1800 | 1770-1790 | 1770-1790 |
| Temperatures reactor 2 (° C.) | 161.7 | 161.7 | 161.7 | 163.7 | 163.7 |
| Production rate (kg/h)* | 6000 | 6000 | 6000 | 6000 | 6000 |

TABLE 4-continued

| Parameter | EXAMPLE 7 | EXAMPLE 8 | EXAMPLE 9 | EXAMPLE 10 | EXAMPLE 11 |
|---|---|---|---|---|---|
| VA feed rate (1/h) | 2850-3200 | 2850-3200 | 2800 | 2400 | 2400 |
| Ethylene feed rate (kg/h) | 4270 | 4270 | 4270 | 4300 | 4300 |
| VeoVa feed rate (1/h) | 700-800 | 800-900 | 900-1000 | 1200 | 1200 |

*Difference in feed rate sum and production rate due to condensation of the comonomers and their low pressure recycle gas/liquid compressor separator. The condensed VeoVa was not reinjected.
Part of unreacted VeoVa remains soluble in the polymer, being removed in a further step of air purge at the silos.

Comparative Example 7

COMPARATIVE EXAMPLE 7 is a commercial resin produced by Braskem, HM728, which is a copolymer of ethylene and vinyl acetate (EVA) with high vinyl-acetate content for specialty compounding applications and hot melt adhesives. The resin present high viscosity and excellent compatibility with adhesives resins and waxes. In addition, it delivers excellent load properties with any kind of fillers. This polymer contains 72 wt % ethylene and 28 wt % vinyl acetate.

Table 5 provides a summary of chemical compositions and the melt flow rates for all synthesized copolymers and terpolymers. The MFR was determined according to ASTM D 123 8 at 190° C./2.16 kg.

TABLE 5

| | Ethylene (wt %)$^{a,b}$ | Vinyl Acetate (wt %)$^{a,b}$ | VeoVa ™ 10 (wt %)$^{a,b}$ | MFR (g/10 min)$^{c}$ |
|---|---|---|---|---|
| EXAMPLE 7 | 68.4 | 26.9 | 4.7 | 6.7 |
| EXAMPLE 8 | 66.1 | 28.3 | 5.9 | 6.9 |
| EXAMPLE 9 | 67.5 | 25.6 | 6.9 | 7.1 |
| EXAMPLE 10 | 66.6 | 24.1 | 8.9 | 5.2 |
| EXAMPLE 11 | 67.8 | 21.8 | 10.4 | 5.8 |
| COMPARITIVE EXAMPLE 7 | 72 | 28 | 0 | 5.9 |

$^{a}$Determined from $^{1}$H NMR;
$^{b}$Determined from $^{13}$C NMR;
$^{c}$Measured based on ASTM D1238 at 190° C./2.16 kg.

Preparation of hotmelt adhesive compositions

Example 12

A hotmelt adhesive composition was prepared by adding 100 g of the polymer composition obtained in EXAMPLE 7, 218 g of Escorez™ 5637 tackifier, 80 g of Sasoff H1 wax and 2 g of Irganox™ 1010 antioxidant into a metal container and stored in an oven at 177° C. for 1 hr. The melted ingredients were then transferred to a mixer and mixed at 177° C. for 15 minutes.

Example 13

A hotmelt adhesive composition was prepared as described in EXAMPLE 12 except that the polymer composition obtained in EXAMPLE 7 was replaced with the polymer composition obtained in EXAMPLE 8.

Example 14

A hotmelt adhesive composition was prepared as described in EXAMPLE 12 except that the polymer composition obtained in EXAMPLE 7 was replaced with the polymer composition obtained in EXAMPLE 9.

Example 15

A hotmelt adhesive composition was prepared as described in EXAMPLE 12 except that the polymer composition obtained in EXAMPLE 7 was replaced with the polymer composition of EXAMPLE 10.

Example 16

A hotmelt adhesive composition was prepared as described in EXAMPLE 12 except that the polymer composition obtained in EXAMPLE 7 was replaced with the polymer composition of EXAMPLE 11.

Comparative Example 8

A hotmelt adhesive composition was prepared as described in EXAMPLE 12 except that the polymer composition obtained in EXAMPLE 7 was replaced with the polymer composition obtained in COMPARATIVE EXAMPLE 7.

Table 6 shows the wt % ratios of each component used to produce the hotmelt adhesive compositions of EXAMPLE 12-16 and COMPARATIVE EXAMPLE 8. As illustrated in Table 6, quantities of all components were kept consistent and only the type of terpolymers were varied. The formulation shown in Table 6 is a standard formulation for a structural adhesive application.

TABLE 6

| Components | Content (wt %) |
|---|---|
| Polymer compositions (EXAMPLE 12-16, COMPARATIVE EXAMPLE 8) | 25 |
| Tackifier (Escorez ™ 5637) | 54.5 |
| Wax (Sasol ™ H1) | 20 |
| Antioxidant (Irganox ™ 1010) | 0.5 |

Table 7 provides a summary of various hotmelt adhesive composition properties.

The viscosity of EXAMPLE 12-16 and COMPARATIVE EXAMPLE 8 at 150° C. and 177° C. was determined according to ASTM D1084-08. The results indicate that hotmelt adhesive compositions of EXAMPLE 12-16, which contain a terpolymer of ethylene, vinyl acetate and branched vinyl ester monomers, have lower viscosity than the hotmelt adhesive compositions of COMPARATIVE EXAMPLE 8, which does not contain branched vinyl ester monomers.

Molten Garner color of EXAMPLE 12-16 and COMPARATIVE EXAMPLE 8 was determined according to ASTM 1544-04, and peel adhesion fail temperature (PAFT)

and shear adhesion fail temperature (SAFT) was determined according to ASTM D4498-07.

A cloud point of EXAMPLE 12-16 and COMPARATIVE EXAMPLE 8 was determined according to ASTM D6038. A cloud point is the temperature which a transparent solution undergoes a phase separation and forms a cloudy appearance. As illustrated in Table 7, EXAMPLE 12-16 showed cloud points in the range of 89° C. to 95° C.

Thermal stability of the hotmelt adhesive composition of EXAMPLE 12-16 and COMPARATIVE EXAMPLE 8 was determined by measuring 200-hour viscosity, 200-hour color and percent viscosity change in accordance with ASTM D4499. Parameters such as viscosities, viscosity change and color after stored for 200 hours are tested to determine the thermal stability.

position obtained in EXAMPLE 7 was replaced with the polymer composition of EXAMPLE 10.

Example 21

A hotmelt adhesive composition was prepared as described in EXAMPLE 17 except that the polymer composition obtained in EXAMPLE 7 was replaced with the polymer composition of EXAMPLE 11.

Comparative Example 9

A hotmelt adhesive composition was prepared as described in EXAMPLE 17 except that the polymer com-

TABLE 7

|  | EXAMPLE 12 | EXAMPLE 13 | EXAMPLE 14 | EXAMPLE 15 | EXAMPLE 16 | COMPARATIVE EXAMPLE 8 |
|---|---|---|---|---|---|---|
| Viscosity 150° C. (cPS) | 11670 | 11680 | 11000 | 13380 | 12960 | 13480 |
| Viscoisty 177° C. (cPS) | 4783 | 4680 | 4550 | 5313 | 5217 | 5450 |
| Molten Garner Color | 3 | 2 | 2 | 2 | 2 | 3 |
| PAFT 100 g (° C.) | 75 | 74 | 74 | 73 | 74 | 76 |
| SAFT 500 g (° C.) | 94 | 96 | 96 | 93 | 94 | 95 |
| Cloud Point (° C.) | 95 | 92 | 89 | 97 | 95 | 94 |
| 200 hr Viscosity 177° C. (cPS) | 4725 | 5382 | 4513 | 5430 | 5208 | 5233 |
| 200 hr color | 12 | 12 | 12 | 10 | 12 | 11 |
| 200 hr % viscosity change | −1.2 | 15 | −0.8 | 2.2 | −0.1 | −4 |

Preparation of hotmelt adhesive compositions

Example 17

A hotmelt adhesive composition was prepared by adding 100 g of the polymer composition obtained in EXAMPLE 7, 218 g of Westrez™ 5101 tackifier, 80 g of Sasol™ H1 wax and 2 g of Irganox™ 1010 antioxidant into a metal container and stored in an oven at 177° C. for 1 hr. The melted ingredients were then transferred to a mixer and mixed at 177° C. for 15 minutes.

Example 18

A hotmelt adhesive composition was prepared as described in EXAMPLE 17 except that the polymer composition obtained in EXAMPLE 7 was replaced with the polymer composition obtained in EXAMPLE 8.

Example 19

A hotmelt adhesive composition was prepared as described in EXAMPLE 17 except that the polymer composition obtained in EXAMPLE 7 was replaced with the polymer composition obtained in EXAMPLE 9.

Example 20

A hotmelt adhesive composition was prepared as described in EXAMPLE 17 except that the polymer composition obtained in EXAMPLE 7 was replaced with the polymer composition obtained in COMPARATIVE EXAMPLE 7.

Table 6 shows the wt % ratios of each component used to produce the hotmelt adhesive compositions of EXAMPLE 17 to 21 and COMPARATIVE EXAMPLE 9. As illustrated in Table 8, quantities of all components were kept consistent and only the type of terpolymers were varied. The formulation shown in Table 6 is a standard formulation for a structural adhesive application.

TABLE 8

| Components | Content (wt %) |
|---|---|
| Polymer compositions (EXAMPLE 12-16, COMPARATIVE EXAMPLE 8) | 25 |
| Tackifier (Westrez ™ 5101) | 54.5 |
| Wax (Sasol ™ H1) | 20 |
| Antioxidant (Irganox ™ 1010) | 0.5 |

Table 9 provides a summary of various hotmelt adhesive composition properties.

The viscosity of EXAMPLE 17-21 and COMPARATIVE EXAMPLE 9 at 150° C. and 177° C. was determined according to ASTM D1084-08. The results indicate that hotmelt adhesive compositions of EXAMPLE 17-21, which contain a terpolymer of ethylene, vinyl acetate and branched vinyl ester monomers, have lower viscosity than the hotmelt adhesive compositions of COMPARATIVE EXAMPLE 9, which does not contain branched vinyl ester monomers.

Molten Garner color of EXAMPLE 17-21 and COMPARATIVE EXAMPLE 9 was determined according to ASTM 1544-04, and peel adhesion fail temperature (PAFT) and shear adhesion fail temperature (SAFT) was determined according to ASTM D4498-07.

A cloud point of EXAMPLE 17-21 and COMPARATIVE EXAMPLE 9 was determined according to ASTM D6038. As illustrated in Table 7, EXAMPLE 17-21 showed cloud points in the range of 89° C. to 95° C.

Thermal stability of the hotmelt adhesive composition of EXAMPLE 17-21 and COMPARATIVE EXAMPLE 9 was determined by measuring 200-hour viscosity, 200-hour color and percent viscosity change in accordance with ASTM D4499. Properties such as viscosities, viscosity change and color after stored for 200 hours were obtained to determine the thermal stability.

TABLE 9

| | EXAMPLE 17 | EXAMPLE 18 | EXAMPLE 19 | EXAMPLE 20 | EXAMPLE 21 | COMPARATIVE EXAMPLE 9 |
|---|---|---|---|---|---|---|
| Viscosity 150° C. (cPS) | 9760 | 8850 | 8460 | 11130 | 10400 | 10330 |
| Viscoisty 177° C. (cPS) | 3385 | 3608 | 3508 | 4367 | 4250 | 3950 |
| Molten Garner Color | 5 | 3 | 3 | 3 | 3 | 5 |
| PAFT 100 g (° C.) | 68 | 70 | 67 | 70 | 70 | 71 |
| SAFT 500 g (° C.) | 97 | 97 | 97 | 97 | 99 | 97 |
| Cloud Point (° C.) | 101 | 106 | 111 | 110 | 108 | 104 |
| 200 hr Viscosity 177° C. (cPS) | 5450 | 5380 | 5375 | 5740 | 5558 | 6700 |
| 200 hr color | 13 | 13 | 13 | 12 | 13 | 10 |
| 200 hr % viscosity change | 69.6 | 61 | 49.1 | 53.2 | 31.4 | 30.8 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A hotmelt adhesive composition comprising:
a polymer produced from ethylene, one or more branched vinyl ester monomers, and optionally, vinyl acetate; and
a tackifier,
wherein the one or more branched vinyl ester monomers have the general structure (I) or the general structure (II):

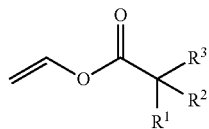

(I)

wherein $R^1$, $R^2$, and $R^3$ have a combined carbon number of 3 to 20,

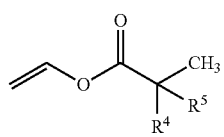

(II)

wherein and $R^5$ have a combined carbon number of 7.

2. The hot melt adhesive composition of claim 1, further comprising a secondary polymer at an amount that ranges from 0.1 to 90 wt % of the hot melt adhesive composition.

3. The hot melt adhesive composition of claim 2, wherein the secondary polymer is selected from a group consisting of EVA, ethylene-acrylic ester copolymers, polyethylene, polypropylene, styrene block copolymers, and combinations thereof.

4. The hotmelt adhesive composition of claim 1, wherein the polymer has a number average molecular weight ranging from 5 to 10,000 kDa, and a molecular weight distribution ranging from 1 to 60, obtained by GPC.

5. The hotmelt adhesive composition of claim 1, further comprising a wax and/or an antioxidant.

6. The hotmelt adhesive composition of claim 1, wherein the polymer is a copolymer consisting of ethylene and one or more branched vinyl ester or a terpolymer consisting of ethylene, the one or more branched vinyl ester and vinyl acetate.

7. The hotmelt adhesive composition of claim 1, wherein the polymer has:
an ethylene content ranging from 10 to 99.99 wt %,
a branched vinyl ester content ranging from 0.01 to 90 wt %, and optionally,
a vinyl acetate content ranging from 0.01 to 89.99 wt %.

8. The hotmelt adhesive composition of claim 1, wherein the polymer is polymerized under conditions comprising a reactor pressure of greater than 1000 bar and a reactor temperature of greater than 50° C.

9. The hotmelt adhesive composition of claim 1, wherein, according to ASTM D3418:
a melting temperature of the polymer ranges from 0 to 150° C.,
a crystallization temperature of the polymer ranges from 0 to 150° C., and/or
a heat of crystallization of the polymer ranges from 0 to 280 J/g.

10. The hotmelt adhesive composition of claim 1, wherein the polymer has a storage modulus at 0° C. in a range from 0.1 MPa to 10 GPa.

11. The hotmelt adhesive composition of claim 1, wherein a melt flow rate (MFR) of the polymer according to ASTM D1238 at 190° C./2.16 kg ranges from 0.01 g/10 min to 1000 g/10 min.

12. The hotmelt adhesive composition of claim 1, wherein a density of the polymer according to ASTM D792 ranges from of 0.85 g/cm$^3$ to 1.5 g/cm$^3$.

13. The hotmelt adhesive composition of claim 1, wherein a bio-based carbon content of the polymer according to ASTM D6866 D18 ranges from of 1% to 100%.

14. The hotmelt adhesive composition of claim 1, wherein:
the polymer is present at an amount ranging from 10 wt % to 90 wt % of the hotmelt adhesive composition, and
the tackifier is present at an amount ranging from 10 wt iii to 90 wt % of the hotmelt adhesive composition.

15. The hotmelt adhesive composition of claim 1, wherein a viscosity according to ASTM D1084-08 at 150° C. ranges from 300 cPs to 20000 cPs.

16. The hotmelt adhesive composition of claim 1, wherein a viscosity according to ASTM D1084-08 at 177° C. ranges from 300 cPs to 10000 cPs.

17. The hotmelt adhesive composition of claim 1, wherein a molten Garner color according to ASTM D1544-04 ranges from 1 to 7.

18. The hotmelt adhesive composition of claim 1, wherein:
a peel adhesion fail temperature (PAFT) according to ASTM D4498-07 at 100 grams is at least 40° C., and/or
a shear adhesion fail temperature (SAFT) according to ASTM D4498-07 at 500 grams is at least 70° C.

19. The hotmelt adhesive composition of claim 1, wherein a cloud point according to ASTM D6038 ranges from 30° C. to 140° C. or does not exist.

20. The hotmelt adhesive composition of claim 1, wherein, according to ASTM D4499:
a 100-hour viscosity at 177° C. ranges from 300 cPs to 10000 cPs, and/or
a 100-hour color ranges from 3 to 17, and/or
an absolute value of a 100-hour percent viscosity change ranges from 0% to 70%.

21. The hotmelt adhesive composition of claim 1, wherein, according to ASTM D4499:
a 200-hour viscosity at 177° C. ranges from 300 cPs to 10000 cPs, and/or
a 200-hour color ranges from 3 to 17, and/or
an absolute value of a 200-hour percent viscosity change ranges from 0% to 70%.

22. A method for producing a hotmelt adhesive composition comprising:
adding a polymer produced from ethylene, one or more branched vinyl ester monomers, and optionally, vinyl acetate and a tackifier into a mixer;
optionally adding a wax and/or an antioxidant into the mixer; and
mixing the polymer and the tackifier, and the optional wax and/or antioxidant at a temperature in a range from 110° C. to 220° C. to form the hotmelt adhesive composition,
wherein the one or more branched vinyl ester monomers have the general structure (I) or the general structure (II):

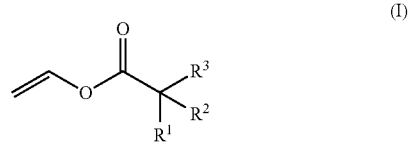

wherein $R^1$, $R^2$, and $R^3$ have a combined carbon number of 3 to 20,

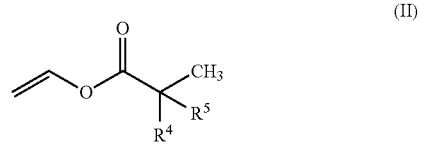

wherein $R^4$ and $R^5$ have a combined carbon number of 7.

23. A method for bonding a substrate to a similar or dissimilar substrate comprising:
applying the hotmelt adhesive composition of claim 1 to at least one substrate; and
bonding the at least one substrate and the hotmelt adhesive composition together.

24. A multi-layer article, comprising:
at least one layer of the hotmelt adhesive compositions of claim 1 and one or more substrate layers.

* * * * *

UNITED STATES PATENT AND TRADEMARK OFFICE
CERTIFICATE OF CORRECTION

PATENT NO. : 11,827,815 B2
APPLICATION NO. : 17/579301
DATED : November 28, 2023
INVENTOR(S) : Hadi Mohammadi et al.

Page 1 of 1

It is certified that error appears in the above-identified patent and that said Letters Patent is hereby corrected as shown below:

In the Claims

At Column 28, Claim number 1, Line number 50:
"wherein and $R^5$" should read -- wherein $R^4$ and $R^5$ --;

At Column 29, Claim number 13, Line number 35:
"ASTM D6866 D18" should read -- ASTM D6866-18 --; and At Column 29, Claim number 14, Line numbers 40-41:
"10 wt iii" should read -- 10 wt% --.

Signed and Sealed this
Twenty-fifth Day of February, 2025

Coke Morgan Stewart
*Acting Director of the United States Patent and Trademark Office*